(12) United States Patent
Schmidl et al.

(10) Patent No.: US 7,133,396 B1
(45) Date of Patent: Nov. 7, 2006

(54) DYNAMIC ASSIGNMENT OF RETRANSMISSION SLOTS FOR ENHANCED QUALITY IN WIRELESS COMMUNICATION LINKS

(75) Inventors: Timothy M. Schmidl, Dallas, TX (US); Anand G. Dabak, Plano, TX (US); Mohammed Nafie, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 650 days.

(21) Appl. No.: 09/611,879

(22) Filed: Jul. 7, 2000

Related U.S. Application Data (60) Provisional application No. 60/187,260, filed on Mar. 6, 2000.

(51) Int. Cl.
*H04B 7/212* (2006.01)
(52) U.S. Cl. .................. 370/347; 370/337; 370/459; 370/442; 370/480; 714/748; 714/749
(58) Field of Classification Search .............. 370/442, 370/459, 337, 342–347, 321, 294, 468, 319, 370/315, 480, 350, 335, 336, 443, 503, 528, 370/326; 455/509; 714/749, 748
See application file for complete search history.

(56) References Cited

U.S. PATENT DOCUMENTS

| | | | |
|---|---|---|---|
| 5,303,234 A * | 4/1994 | Kou | 370/442 |
| 5,420,851 A * | 5/1995 | Seshadri et al. | 370/280 |
| 5,537,414 A * | 7/1996 | Takiyasu et al. | 370/347 |
| 5,602,836 A * | 2/1997 | Papadopoulos et al. | 370/280 |
| 5,684,791 A * | 11/1997 | Raychaudhuri et al. | 370/310.2 |
| 5,862,142 A * | 1/1999 | Takiyasu et al. | 370/480 |
| 6,026,297 A * | 2/2000 | Haartsen | 455/426.1 |
| 6,396,457 B1 * | 5/2002 | Gatherer et al. | 343/853 |
| 6,415,312 B1 * | 7/2002 | Boivie | 709/200 |
| 6,690,657 B1 * | 2/2004 | Lau et al. | 370/315 |

OTHER PUBLICATIONS

"Capture-Division packet Access For Wireless Personal Communications", Flaminio Borgonovo, et al., IEEE Journal on Selected Areas in Communications, vol. 14, No. 4, May 1996, pp. 609-621.
"Performance of the Burst-Level ARQ Error Protection Scheme in an Indoor Mobile Radio Environment", Esa Malkamaki, Vehicular Technology Conference, 1994 IEEE 44th Stockholm, Sweden Jun. 8-10, 1994, New York, NY, USA, IEEE, pp. 1412-1416, xp010'122", ISBN: 0-7803-1927-3.
"The Bluetooth Radio System", Jaap C. Haartsen, IEEE Personal Communications, IEEE Communications Society, US, vol. 7, NR. 1, pp. 28-36, XP000908653, ISSN: 1070-9916, Feb. 2000.
"Networks for Homes", Amitava Dutta-Roy, Contributing Editor, IEEE Spectrum, Communications, Dec. 1999, pp. 26-33.

* cited by examiner

*Primary Examiner*—Wellington Chin
*Assistant Examiner*—Chuong Ho
(74) *Attorney, Agent, or Firm*—W. James Brady, III; Frederick J. Telecky, Jr.

(57) ABSTRACT

In wireless communication arrangements that utilize a transmission period of time followed by a retransmission period of time, the utilization and effectiveness of retransmission communications can be advantageously increased by dynamically assigning desired communications to respective retransmission time slots of the retransmission period.

5 Claims, 5 Drawing Sheets

DYNAMIC ASSIGNMENT OF RETRANSMISSION SLOTS FOR ENHANCED QUALITY IN WIRELESS COMMUNICATION LINKS

This application claims the priority under 35 U.S.C. 119(e)(1) of U.S. provisional application No. 60/187,260, filed on Mar. 6, 2000.

FIELD OF THE INVENTION

The invention relates generally to wireless communications and, more particularly, to wireless communications that utilize retransmissions.

BACKGROUND OF THE INVENTION

Present telecommunication system technology includes a wide variety of wireless networking systems associated with both voice and data communications. An overview of several of these wireless networking systems is presented by Amitava Dutta-Roy, *Communications Networks for Homes*, IEEE Spectrum, pg. 26, December 1999. Therein, Dutta-Roy discusses several communication protocols in the 2.4 GHz band, including IEEE 802.11 direct-sequence spread spectrum (DSSS) and frequency-hopping (FHSS) protocols. A disadvantage of these protocols is the high overhead associated with their implementation. A less complex wireless protocol known as Shared Wireless Access Protocol (SWAP) also operates in the 2.4 GHz band. This protocol has been developed by the HomeRF Working Group and is supported by North American communications companies. The SWAP protocol uses frequency-hopping spread spectrum technology to produce a data rate of 1 Mb/sec. Another less complex protocol is named Bluetooth after a $10^{th}$ century Scandinavian king who united several Danish kingdoms. This protocol also operates in the 2.4 GHz band and advantageously offers short-range wireless communication between Bluetooth devices without the need for a central network.

The Bluetooth protocol provides a 1 Mb/sec data rate with low energy consumption for battery powered devices operating in the 2.4 GHz ISM (industrial, scientific, medical) band. The current Bluetooth protocol provides a 10-meter range and a maximum asymmetric data transfer rate of 723 kb/sec. The protocol supports a maximum of three voice channels for synchronous, CVSD-encoded transmission at 64 kb/sec. The Bluetooth protocol treats all radios as peer units except for a unique 48-bit address. At the start of any connection, the initiating unit is a temporary master. This temporary assignment, however, may change after initial communications are established. Each master may have active connections of up to seven slaves. Such a connection between a master and one or more slaves forms a "piconet." Link management allows communication between piconets, thereby forming "scatternets." Typical Bluetooth master devices include cordless phone base stations, local area network (LAN) access points, laptop computers, or bridges to other networks. Bluetooth slave devices may include cordless handsets, cell phones, headsets, personal digital assistants, digital cameras, or computer peripherals such as printers, scanners, fax machines and other devices.

The Bluetooth protocol uses time-division duplex (TDD) to support bi-directional communication. Frequency hopping permits operation in noisy environments and permits multiple piconets to exist in close proximity. The frequency hopping scheme permits up to 1600 hops per second over 79 1-MHZ channels or the entire 2.4 GHz ISM spectrum. Various error correcting schemes permit data packet protection by ⅓ and ⅔ rate forward error correction. Further, Bluetooth uses retransmission of packets for guaranteed reliability. These schemes help correct data errors, but at the expense of throughput.

The Bluetooth protocol is specified in detail in *Specification of the Bluetooth System*, Version 1.0A, Jul. 26, 1999, which is incorporated herein by reference.

For speech transmissions, the Bluetooth specification calls for 64 kilobits/second CVSD speech coding on an SCO (Synchronous Connection-Oriented) link. This means that a Bluetooth system can support up to three voice channels for up to three users. On the other hand, according to known techniques, the speech can be coded using a lower rate coder, and can then be treated as data for transmission on Bluetooth ACL (Asynchronous Connection-Less) links. In this fashion, more voice channels and users can be supported. Also, ACL links allow retransmission of packets, which can provide enhanced quality relative to SCO to links which do not allow retransmission of packets.

The present invention recognizes the desireability of further improving the quality of speech transmission on Bluetooth ACL links and other wireless communication links. To this end, the invention advantageously provides for increasing the utilization and effectiveness of retransmission communications by dynamically assigning desired communications to the respective retransmission slots.

DETAILED DESCRIPTION

Figure 1:
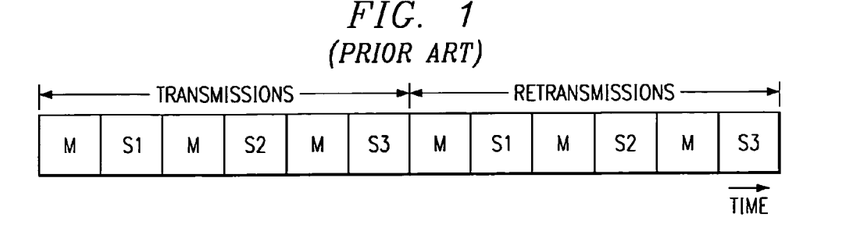
FIG. 1 diagrammatically illustrates an exemplary timing arrangement of transmissions and retransmissions in conventional Bluetooth ACL links.

FIG. 1 illustrates an exemplary transmission//retransmission timing arrangement associated with transmission of speech in the form of data packets transmitted over Bluetooth ACL links. In the example of FIG. 1, M represents a Bluetooth master device and S1, S2 and S3 represent Bluetooth slave devices respectively associated with three users of a Bluetooth system. As illustrated in FIG. 1, for each slave device there is reserved a master-to-slave transmission time slot, a corresponding slave-to-master transmission time slot, a master-to-slave retransmission time slot and a corresponding slave-to-master retransmission time slot. All of the available time slots in FIG. 1 are thus pre-assigned to the three users associated with slave devices S1, S2 and S3.

Figure 2:
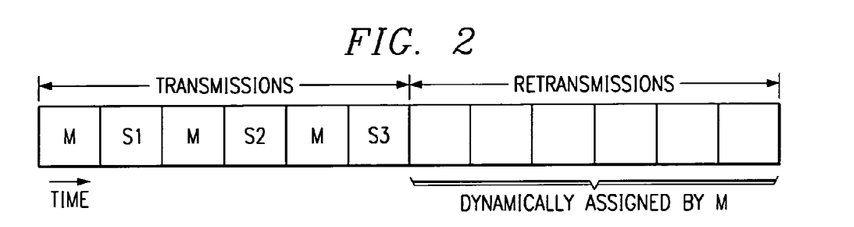
FIG. 2 diagrammatically illustrates an exemplary timing arrangement of transmissions and retransmissions over Bluetooth ACL links according to the present invention.
Figure 3:
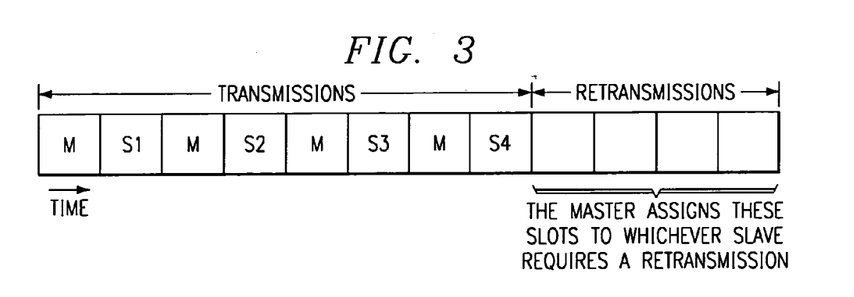
FIGS. 3–5 diagrammatically illustrate applications of the arrangement of FIG. 2 wherein the amount of retransmissions varies inversely with the number of users.

According to exemplary embodiments of the present invention illustrated generally in FIG. 2, a master-to-slave transmission time slot and a slave-to-master transmission time slot are pre-assigned for each slave device in a Bluetooth piconet but, advantageously, the retransmission time slots are not pre-assigned, but rather are dynamically assignable by the master device in order to increase the utilization and efficiency of the retransmissions. According to one exemplary embodiment, whose operation is illustrated in FIG. 3, the first two retransmission time slots of FIG. 1 can be re-assigned as transmission slots, thereby permitting a fourth slave device S4 to join the piconet. The four remaining retransmission slots in FIG. 3 can then be assigned by the master to those slaves which either require retransmission or need to retransmit. For a slave that needs to receive a retransmission, the master retransmits the packet to the slave, and for a slave that needs to retransmit, the master sends to the slave a packet including a negative acknowledgment (NAK). This is described in more detail below.

Figure 4:
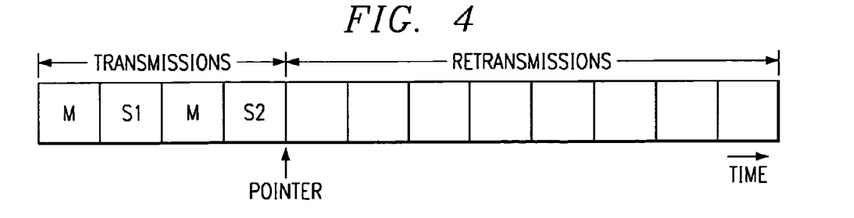
Figure 5:
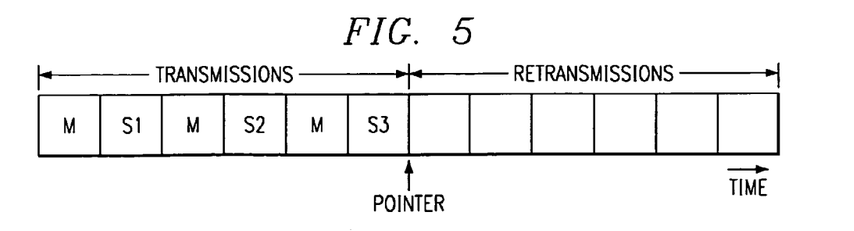

FIGS. 4 and 5 illustrate further exemplary applications of the dynamic retransmission time slot assignment illustrated in FIG. 2. The example of FIG. 4, taken together with the example of FIG. 3 illustrates a situation wherein, for example, the slave devices S3 and S4 of FIG. 3 leave the piconet. In this situation, the transmission slots provided for slaves S3 and S4 in FIG. 3 are instead now designated 1=as retransmission slots, so retransmission begins directly after slave S2 transmits to the master. Thus, according to the invention, as the size of the piconet decreases, the retransmission capabilities increase.

FIG. 5, when taken in conjunction with FIG. 4, illustrates an exemplary situation wherein a slave device S3 joins the piconet. In this situation, the first two retransmission time slots of FIG. 4 are now designated as transmission time slots to use for transmissions to and from slave S3. Referencing FIGS. 3–5, whenever a slave joins (or leaves) the piconet, the master device M can send to all active slaves a broadcast control packet in one of the retransmission slots (for example the first retransmission slot) including information indicative of when the last transmission slot (or the first retransmission slot) will occur.

Figure 6:
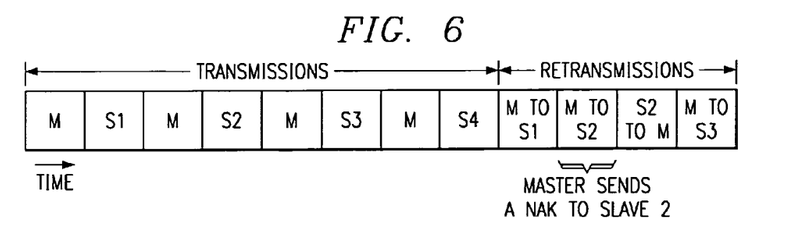
FIG. 6 diagrammatically illustrates an exemplary application of the arrangement of FIG. 2 wherein the communication direction of the retransmission slots is variable.

FIG. 6 diagrammatically illustrates a further exemplary application of dynamic retransmission slot assignment according to the invention. In the example of FIG. 6, the second retransmission slot is used to send from the master to slave S2 a packet including a negative acknowledgment, which indicates that the packet sent from S2 in the fourth transmission time slot of the transmission period was not correctly received by the master. Referring also to FIG. 1, the second retransmission slot is conventionally reserved for transmissions from a slave device to the master device, in contrast to the example of FIG. 6. The third retransmission slot of FIG. 6 is assigned for a retransmission of the aforementioned lost packet from slave S2 to the master device, whereas the third retransmission slot is conventionally assigned to a transmission from the master device (see also FIG. 1). Similarly, the fourth retransmission slot of FIG. 6 is assigned to a transmission from the master to slave S3, whereas the fourth retransmission slot of FIG. 1 is conventionally assigned to a slave transmission. Because transmissions from the master device to the slave devices are permitted in retransmission time slots which are conventionally reserved for transmissions from the slave devices to the master device, the slave devices must listen during each retransmission time slot in order to receive their intended packets.

Figure 7:
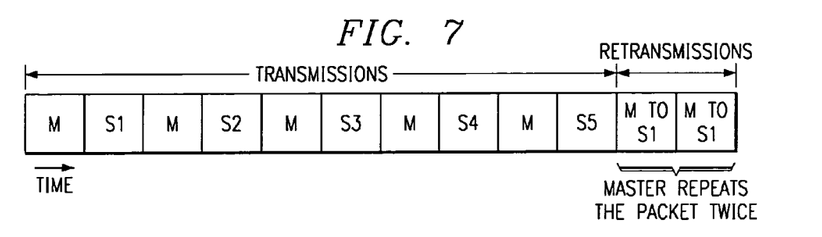
FIG. 7 illustrates a further exemplary application of the arrangement of FIG. 2 wherein the same communication is transmitted in two retransmission slots.

The example of FIG. 7 illustrates a situation where only one packet was lost during the transmission period, namely the packet transmitted by the master to slave S1 during the first transmission time slot (the slave S1 having responded with a NAK in the second transmission time slot). Thus, in this example, each of the two retransmission time slots can be assigned for retransmission of the lost packet from the master device to slave S1.

According to the Bluetooth specification, a slave device is not allowed to transmit in a given time slot unless the master device addressed that slave device in the previous time slot. However, the master-to-slave link (downlink) and the slave-to-master (uplink) are often not symmetrical. Indeed, it can be expected that sometimes, for example, a master-to-slave packet will arrive correctly, but the corresponding slave-to-master packet will be lost. However, because the slave device cannot transmit unless the master device has addressed it in the previous time slot, the slave device cannot, in conventional operation, retransmit the lost packet to the master device in a given time slot unless the master device sends a corresponding negative acknowledgment to that slave in the previous time slot.

According to the invention, when the master device retransmits a packet to a first slave device during a given retransmission slot, the master device can also advantageously use that retransmitted packet to request a second slave device to retransmit to the master device in the next time slot. So long as there are no more than fifteen slaves in the piconet, the master can use the four TYPE bits defined in the Bluetooth specification to identify which of the slave devices is requested to retransmit during the next time slot. One of the sixteen possible values of the four TYPE bits can be used by the master to signal that it (the master) will transmit in the next retransmission slot, and the other fifteen values can be used to designate which of up to fifteen slave devices is requested to retransmit in the next retransmission slot. The above-described use of a retransmission packet directed to a first slave device to request that a second slave device retransmit in the next slot is illustrated in the example of FIG. 8.

Figure 8:
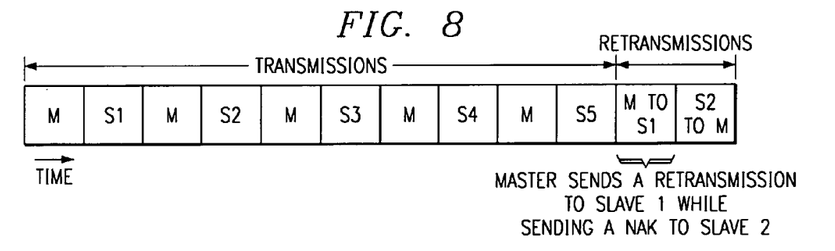
FIG. 8 diagrammatically illustrates a further exemplary application of the arrangement of FIG. 2 wherein a single retransmission slot is used for transmission of two separate communications.

In FIG. 8, the master retransmits a packet to slave 1 (in response to a NAK received from slave S1 in the second transmission slot), and that retransmitted packet includes a request (NAK) for slave 2 to retransmit in the next retransmission time slot. The Bluetooth TYPE bits are available to designate which device is to transmit in the next time slot, because a master-to-slave retransmission packet does not need the TYPE bits to identify its packet type to the receiving slave device. The TYPE bits are not necessary to identify the packet type as a retransmission, because the bit SEQN, as defined in the Bluetooth specification and included in all Bluetooth packets, can be used by a slave device, such as slave S1 in FIG. 8, to determine whether the received packet is a retransmission packet or a NAK, which are the only two possibilities for a master-to-slave packet during the retransmission period.

Figure 9:
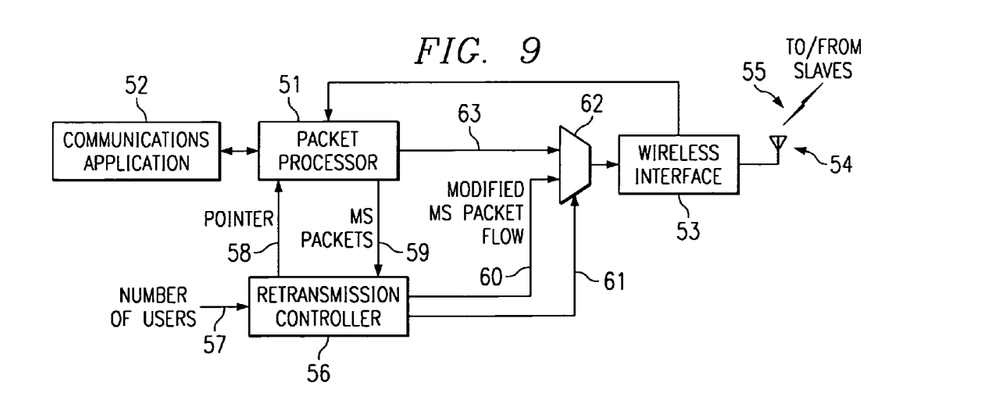
FIG. 9 diagrammatically illustrates pertinent portions of exemplary embodiments of the master device illustrated in FIGS. 2–8.

FIG. 9 diagrammatically illustrates pertinent portions of exemplary embodiments of a master device (e.g., a base unit of a cordless phone system) which can perform the operations illustrated in FIGS. 2–8. The embodiment of FIG. 9 includes a packet processor 51 coupled for bidirectional communications with a communications application 52 and a wireless communications interface 53. The packet processor 51 can receive communication information from the communications application 52, and can use well known conventional techniques to assemble the information into appropriate packets for forwarding to the wireless communications interface 53. The wireless communications interface 53 can use well known conventional techniques to transmit the assembled packets to one or more slave devices via an antenna 54 and a wireless communications link 55, for example a Bluetooth radio link. Conversely, the wireless communications interface 53 can use conventional techniques to receive packets from one or more slave devices via the wireless communications link 55 and the antenna 54. The received packets are then forwarded to the packet processor 51, which can use conventional techniques to disassemble the packets and recover the communication information therefrom. The communication information can then be forwarded to the communications application 52. The above-described cooperation between the packet processor 51, the communications application 52 and the wireless communications interface 53 for permitting wireless communication of packets to and from slave devices is well known in the art.

According to the present invention, a retransmission controller 56 is coupled to the packet processor 51 for implementing dynamic retransmission slot assignment according to the invention. The retransmission controller 56 has an input 57 for receiving conventionally available information indicative of any change in the number of users, for example, any change in the number of slave devices currently active in the piconet. This information is conventionally maintained in the master device. In response to a change in the number of users, the retransmission controller 56 updates an internal pointer which points to the point in time where the transmission period ends and the retransmission period begins. Examples of the pointer are illustrated in FIGS. 4 and 5 above. Each time the retransmission controller updates the pointer in response to a change in the number of users, the retransmission controller at 58 outputs the pointer value to the packet processor 51. From this pointer value, the packet processor 51 knows when the transmission period ends and the retransmission period begins.

The packet processor 51 can use conventional techniques to send and receive all packets during the transmission period, and can also use conventional techniques to produce any master-to-slave (MS) packets which, in view of the packets received (or not received) from the slave devices during the transmission period, need to be transmitted to the slave devices during the retransmission period. For example, during the transmission period in FIG. 6, slave S1 and slave S3 have transmitted a NAK to the master, and the CRC (cyclic redundancy code) checksum value in the packet transmitted to the master by slave S2 does not check correctly. Accordingly, the packet processor 51 would, in response to this transmission activity, conventionally prepare a retransmission packet for transmission from the master to slave S1, a NAK packet for transmission from the master to slave S2, and a retransmission packet for transmission from the master to slave S3. However, instead of transmitting these packets to the slave devices in conventional fashion, the packet processor 51 instead outputs these master-to-slave (MS) packets to an input 59 of the retransmission controller 56. The retransmission controller 56 then assigns these master-to-slave packets to the available slots in the retransmission period as desired, and outputs at 60 a modified master-to-slave packet flow reflecting the retransmission time slot assignments, for example the master-to-slave packet flow illustrated in the retransmission period of FIG. 6.

The retransmission controller uses a control signal 61 to control a selector 62 such that the modified master-to-slave packet flow at 60 is provided to the wireless communications interface 53 during the retransmission period. The control signal 61 controls selector 62 such that the output 60 of the retransmission controller 56 is coupled to the wireless interface 53 during the retransmission period. However, during the transmission period, the control signal 61 controls selector 62 such that the output 63 of the packet processor 51 is coupled to the wireless communications interface 53 for normal transmission of packets to the slave devices.

The master-to-slave packet flows illustrated in the retransmission periods of FIGS. 7 and 8 are further examples of the modified master-to-slave packet flow output at 60 by the retransmission controller 56 of FIG. 9. Comparing the example of FIG. 6 with the example of FIG. 8, the retransmission controller 56 can choose to utilize a conventional NAK packet for sending a NAK to slave S2 as shown in FIG. 6, or the retransmission controller 56 can choose to include the NAK for slave S2 in its retransmission to slave S1, as illustrated in FIG. 8. It should also be noted that the modified master-to-slave packet flow output at 60 by retransmission controller 56 can, when the number of users has changed, include a suitable broadcast packet directing each active slave in the piconet to update its record of the pointer illustrated in FIGS. 4 and 5. For example, the pointer value can be sent to the slaves in a message within a Bluetooth broadcast packet.

Figure 10:
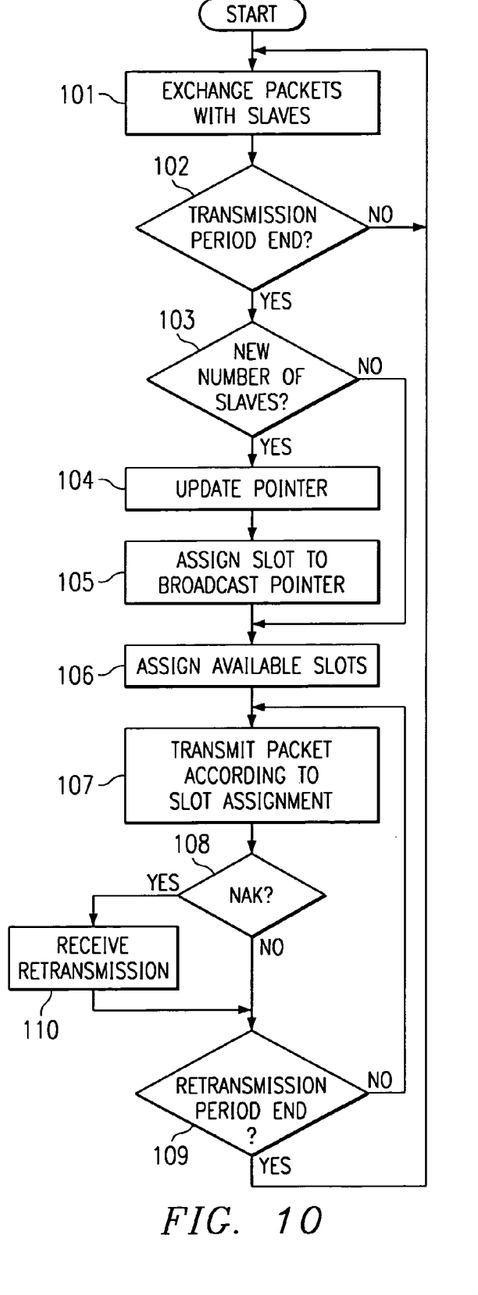
FIG. 10 illustrates exemplary operations which can be performed by the master device of FIG. 9.

FIG. 10 illustrates exemplary operations which can be performed by the master device of FIG. 9. At 101 and 102, the master device exchanges packets with the slave devices of the piconet during the transmission period. After the transmission period ends (known from the pointer value) at 102, it is determined at 103 whether the number of active slave devices in the piconet has changed. If so, the pointer of FIGS. 4 and 5 is updated at 104, and a retransmission slot is assigned at 105 to broadcast the pointer to the slaves of the piconet. After assigning a retransmission slot for broadcasting the pointer at 105, or if the number of slaves has not changed at 103, the available retransmission slots are assigned for the desired packets at 106, for example the packets illustrated in the retransmission slots of FIGS. 6–8. Thereafter at 107, a packet is transmitted according to the slot assignment. If the packet transmitted at 107 includes a NAK at 108, then the corresponding retransmission is received at 110. Thereafter, or if the packet transmitted at 107 does not include a NAK at 108, it is determined at 109 whether or not the retransmission period has ended. If not, the next master-to-slave packet is transmitted at 107. On the other hand, if it is determined at 109 that the retransmission period has ended, for example, either by a time-out condition or by successful retransmission of all desired packets, then operations return to 101 for the exchange of packets with slave devices during the next transmission period. All master-to-slave packets can be considered to be successfully retransmitted when the master has received the expected ACK from the associated slave. All slave-to-master packets can be considered to be successfully retransmitted when the CRC code of the packet checks correctly at the master.

Figure 11:
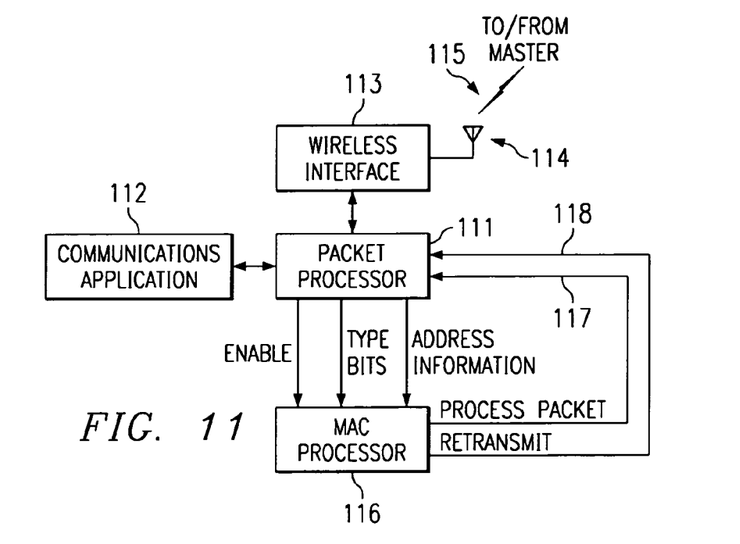
FIG. 11 diagrammatically illustrates pertinent portions of exemplary embodiments of the slave devices illustrated in FIGS. 2–8.

FIG. 11 diagrammatically illustrates pertinent portions of exemplary embodiments of the slave devices (e.g., mobile units in a cordless phone system) illustrated in FIGS. 2–8. The slave device of FIG. 11 includes a packet processor 111 coupled for bidirectional communications with a communications application 112 and a wireless communications interface 113. These components can cooperate in generally the same conventional fashion described above with respect to the packet processor 51, communications application 52 and wireless communications interface 53 of FIG. 9 in order to permit bidirectional wireless packet communications between the slave device of FIG. 11 and the master device of FIG. 9 via antenna 114 and wireless communications link 115, for example a Bluetooth radio link. According to the invention, a MAC (media access control) processor 116 is coupled to the packet processor to receive therefrom the slave address information and the TYPE bits included in the packets received by the packet processor 111. The MAC processor 116 can determine from the address information whether or not the received packet is addressed to the slave device of FIG. 11. If so, the MAC processor determines whether the received packet is a retransmission from the master device and whether it includes a NAK indication from the master device. If the packet is determined to be a retransmission packet, then at 117 the MAC processor signals the packet processor 111 to process the retransmission packet in conventional fashion. Furthermore, if the MAC processor determines that the received packet includes a NAK indication to the slave device of FIG. 11, then at 118 the MAC processor 116 signals the packet processor 111 to retransmit the packet that was earlier transmitted to the master device during the transmission period.

If the address information indicates that the received packet is not addressed to the slave device of FIG. 11, the MAC processor 116 nevertheless inspects the TYPE bits of the received packet. If these bits indicate that the master device has sent a NAK to the device of FIG. 11 in a packet addressed to another slave device, then at 118 the MAC processor 116 instructs the packet processor 111 to retransmit the packet that was earlier transmitted during the transmission period.

Note also that the MAC processor receives an enable signal from the packet processor 111 so that the MAC processor 116 can be enabled for operation only during the retransmission period. The enable signal output by the packet processor 111 is driven in response to the pointer information extracted by the packet processor 111 from the aforementioned broadcast packet transmitted by the master. Thus, when the packet processor 111 determines from its current pointer information that the transmission period has ended, the packet processor 111 drives the enable signal active to enable the MAC processor 116 for operation during the retransmission period. After the retransmission period expires, the enable signal is used to disable MAC processor 116.

Figure 12:
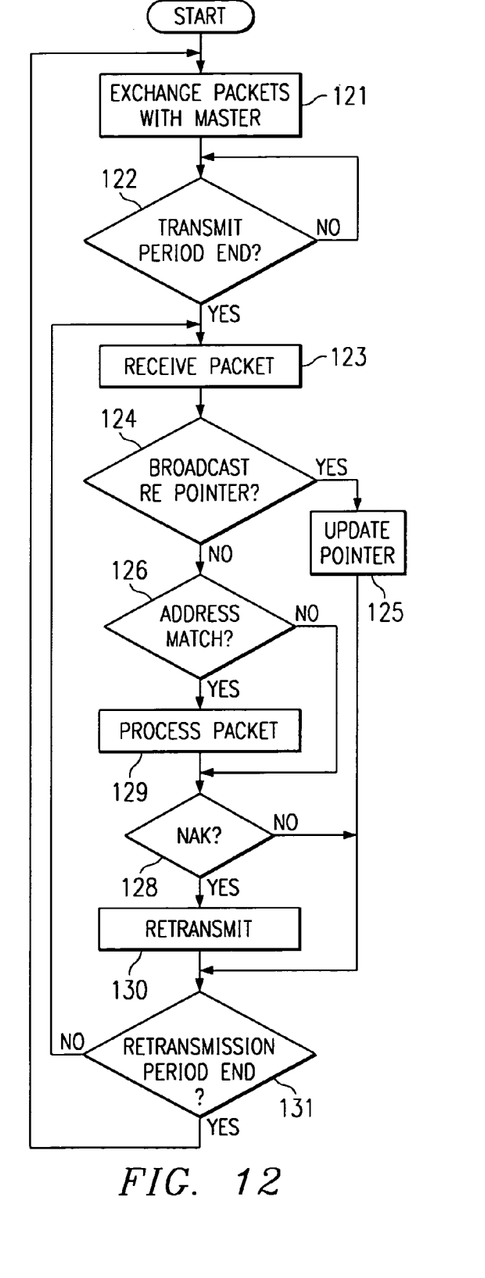
FIG. 12 illustrates exemplary operations which can be performed by the slave device of FIG. 11.

FIG. 12 illustrates exemplary operations which can be performed by the slave device of FIG. 11. As illustrated at 121 and 122, the slave device exchanges packets with the master device, and then awaits the end of the transmission period (known from the pointer value). After the transmission period has ended at 122, the slave device receives a packet at 123, and thereafter determines at 124 whether or not the packet is a broadcast packet regarding a new pointer value. If so, the pointer value is updated at 125. If the received packet is not a broadcast packet regarding the new pointer value at 124, then it is determined at 126 whether or not the received packet is addressed to the slave device. If so, the received packet can be processed conventionally at 129. It is then determined at 128 whether or not the received packet includes a NAK indication. If so, a retransmission is performed at 130.

If it is determined at 126 that the received packet does not address the slave device, it is thereafter determined at 128 (e.g., from the TYPE bits) whether or not the received packet nevertheless includes a NAK for the slave device. If so, a retransmission is performed at 130. After retransmitting at 130, or after determining that no NAK has been received at 128, or after updating the pointer at 125, it is determined at 131 whether or not the retransmission period has ended. If not, then the above-described operations at 123–130 are repeated until it is determined at 131 that the retransmission period has ended, whereupon the slave device exchanges packets with the master at 121 in the next transmission period.

Figure 13:
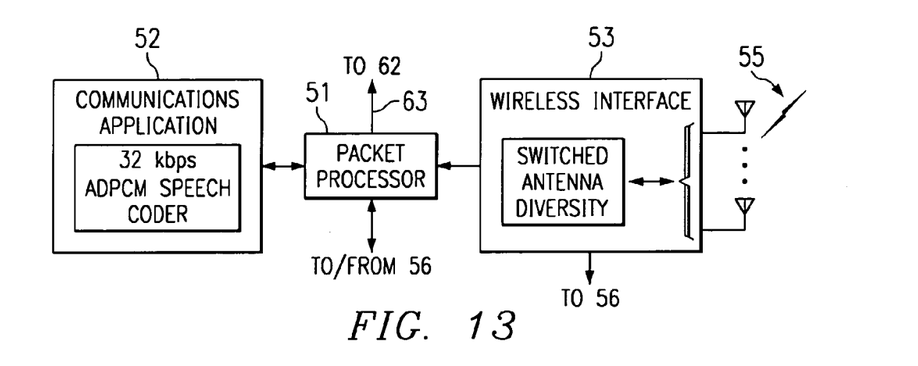
FIGS. 13 and 13A diagrammatically illustrate pertinent portions of further exemplary embodiments of the master device of FIG. 9.

FIG. 13 diagrammatically illustrates pertinent portions of a further exemplary embodiment of the master device of FIG. 9. In the embodiment of FIG. 13, the communications application 52 (see also FIG. 9) includes a conventional 32 kilobit/second ADPCM speech coder. This permits up to 4 users with 2 retransmissions. The wireless communications interface 53 of FIG. 13 (see also FIG. 9) includes a conventional switched antenna diversity section which controls wireless communications over the wireless communications link 55 via a plurality of antennas. The exemplary embodiment of FIG. 13 can otherwise be the same as FIG. 9.

Figure 13A:
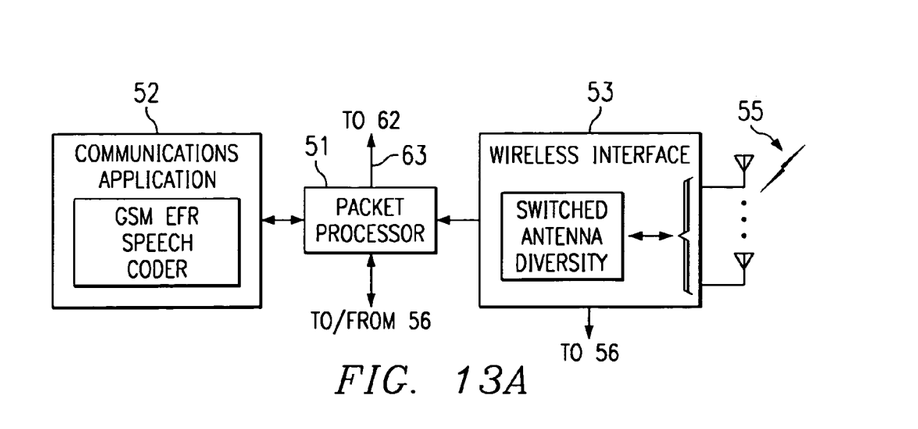

FIG. 13A illustrates an embodiment generally similar to FIG. 13, but including a conventional GSM EFR speech coder.

Figure 14:
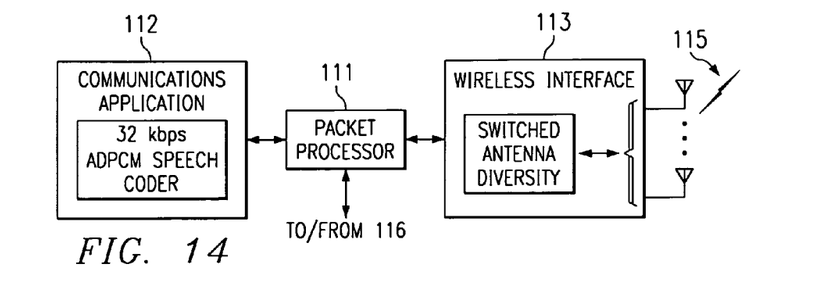
FIGS. 14 and 14A diagrammatically illustrate pertinent portions of further exemplary embodiments of the slave device of FIG. 11.

FIG. 14 diagrammatically illustrates pertinent portions of a further exemplary embodiment of the slave device of FIG. 11. In the embodiment of FIG. 14, the communications application 112 (see also FIG. 11) includes a conventional 32 kilobits/second ADPCM speech coder. The wireless communications interface 113 of FIG. 14 (see also FIG. 11) includes a conventional switched antenna diversity section which controls wireless communications over the wireless communications link 115 via a plurality of antennas. The exemplary embodiment of FIG. 14 can otherwise be the same as FIG. 11.

Figure 14A:
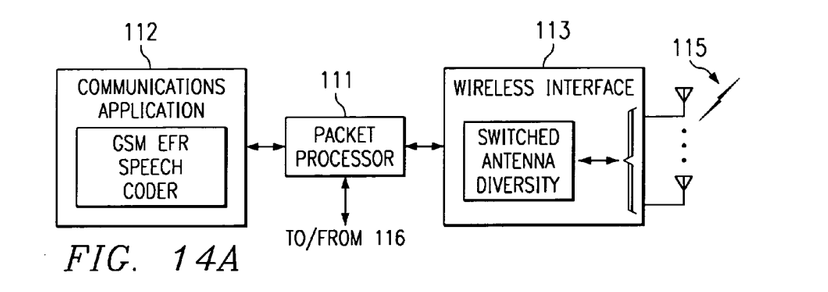

FIG. 14A illustrates an embodiment generally similar to FIG. 14, but including a conventional GSM EFR speech coder.

Figure 15:
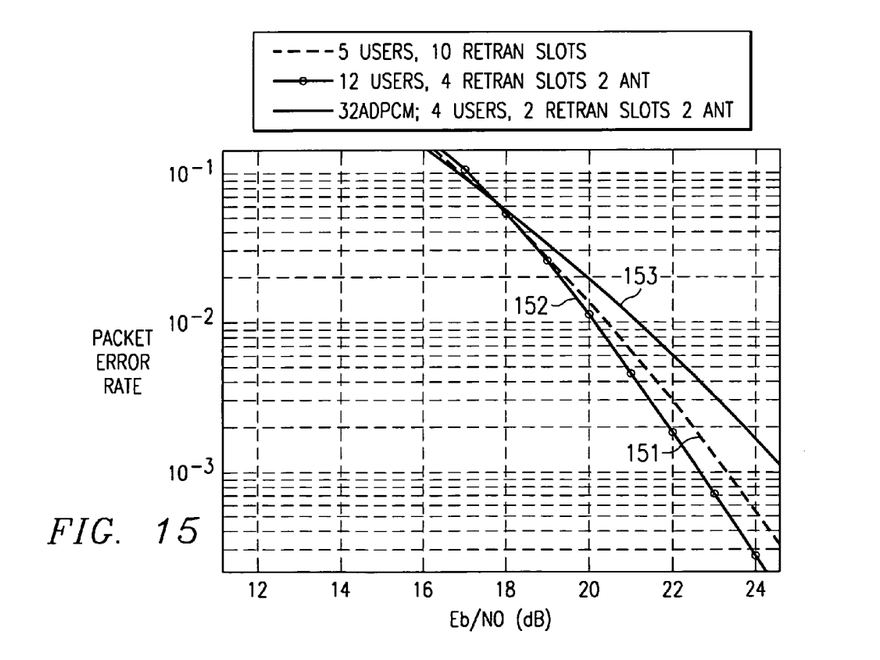
FIG. 15 illustrates exemplary simulation results associated with the embodiments of FIGS. 13 and 14.

FIG. 15 illustrates exemplary simulation results 151 associated with the embodiments of FIGS. 13 and 14 (32 kbps APDCM speech coding), as compared to the embodiments of FIGS. 13A and 14A (GSM EFR speech coding) with (152) and without (153) transmission diversity.

It will be evident to workers in the art that the above-described embodiments of FIGS. 2–14A can be readily implemented, for example, by suitable modifications in software, hardware, or a combination of software and hardware, in conventional wireless communication devices such as Bluetooth masters and slaves.

Although exemplary embodiments of the invention are described above in detail, this does not limit the scope of the invention, which can be practiced in a variety of embodiments.

What is claimed is:

1. A method of controlling wireless communication between a first wireless communication device and a plurality of further wireless communication devices, comprising:
   the first device attempting to perform a plurality of communications with the further devices via a wireless communication link during respective transmission time slots of a transmission period that have been assigned to the respective communications;
   the first device determining which of said communications has been successfully performed and which of said communications has not been successfully performed;
   responsive to said determining step, the first device assigning to respective retransmission time slots of a retransmission period a plurality of further communications between the first device and the further devices; and
   for each of the further communications, one of the first device and the further devices transmitting the further communication via the wireless communication link during the retransmission time slot assigned to the further communication,
   wherein said determining step includes the first device determining that the first device needs to retransmit to one of the further devices during the retransmission period a first packet that was transmitted by the first device to the one further device during the transmission period, and the first device also determining that the first device needs to transmit to a second further device during the retransmission period a second packet including an indication that the second further device should retransmit to the first device during the retransmission period a third packet that was transmitted by the second further device to the first device during the transmission period.

2. The method of claim 1, wherein said assigning step includes assigning transmission of the first and second packets, respectively, to adjacent retransmission time slots.

3. The method of claim 1, wherein said assigning step includes assigning transmission of both the first packet and said indication to a single retransmission time slot.

4. The method of claim 3, wherein said transmitting step includes the first device incorporating said indication into the first packet and transmitting the first packet to the one further device via the wireless communication link during the single retransmission time slot.

5. The method of claim 4, wherein said first packet is a packet according to Bluetooth protocol, said incorporating step including the first device using Bluetooth TYPE bits in the first packet to incorporate said indication into the first packet.

* * * * *